United States Patent

[11] 3,592,093

[72] Inventor Alves Cantelli
via Don Minzoni 5, Rastignano (Bologna), Italy
[21] Appl. No. 844,294
[22] Filed July 24, 1969
[45] Patented July 13, 1971
[32] Priority Aug. 10, 1968
[33] Italy
[31] 1742A/68

[54] MACHINES FOR CUTTING SHEET MATERIAL, SHEET METAL AND THE LIKE
6 Claims, 7 Drawing Figs.

[52] U.S. Cl. ................................................ 83/364,
83/393, 83/467, 269/320

[51] Int. Cl. .................................................. B26d 7/16
[50] Field of Search... ................................... 83/364,
391, 393, 467, 468; 269/319, 320, 305

[56] References Cited
UNITED STATES PATENTS
1,885,370 11/1932 Minkow ...................... 269/319 X
2,607,421 8/1952 Anderson .................... 83/364 X Primary Examiner—James M. Meister
Attorney—Holman & Stern ABSTRACT: Automatic guides for positioning and aligning sheet material to be cut in which the guides carry elements to control a drive, which can be set to advance and retract and partially rotate the guides to required positions.

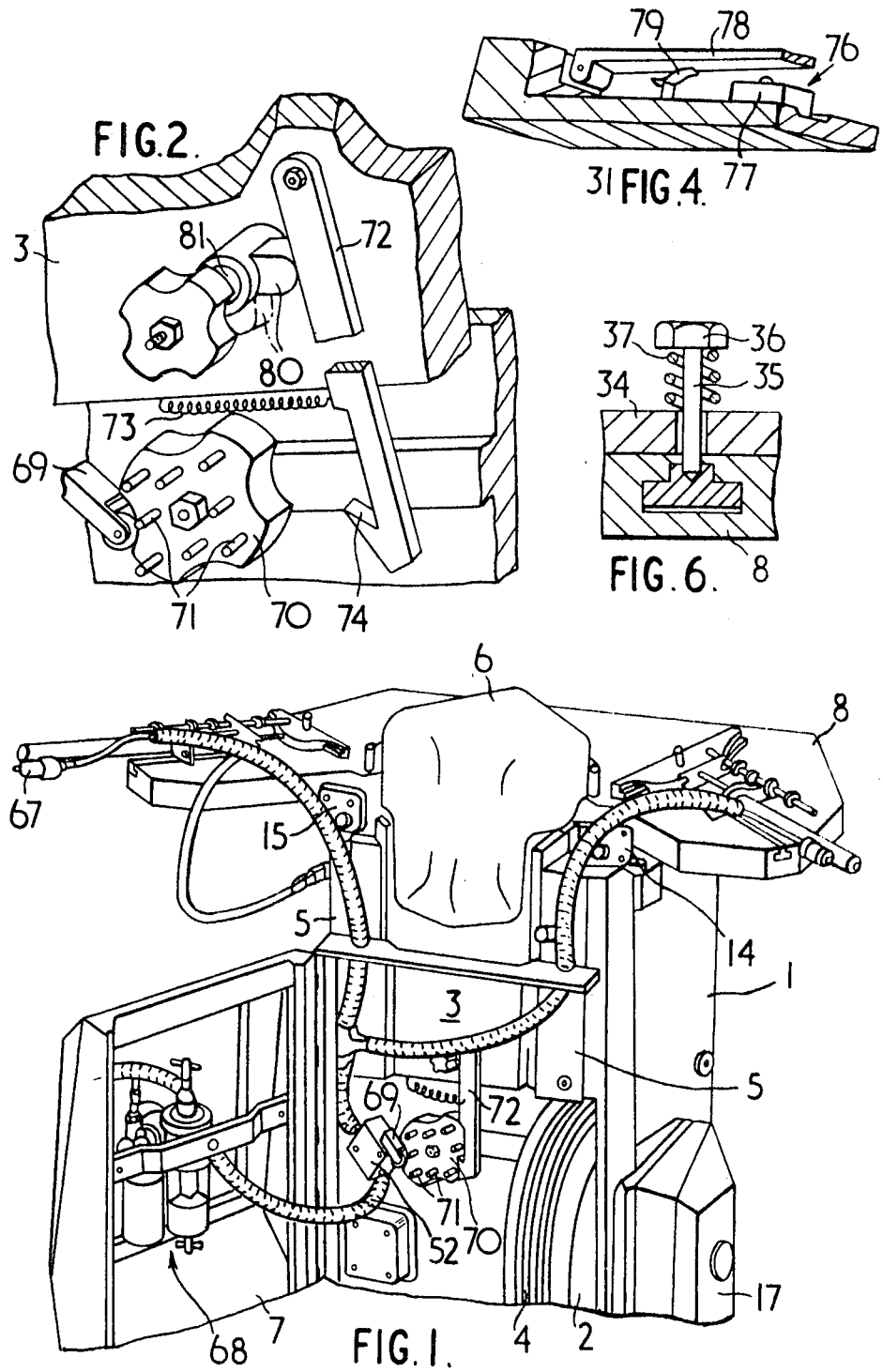

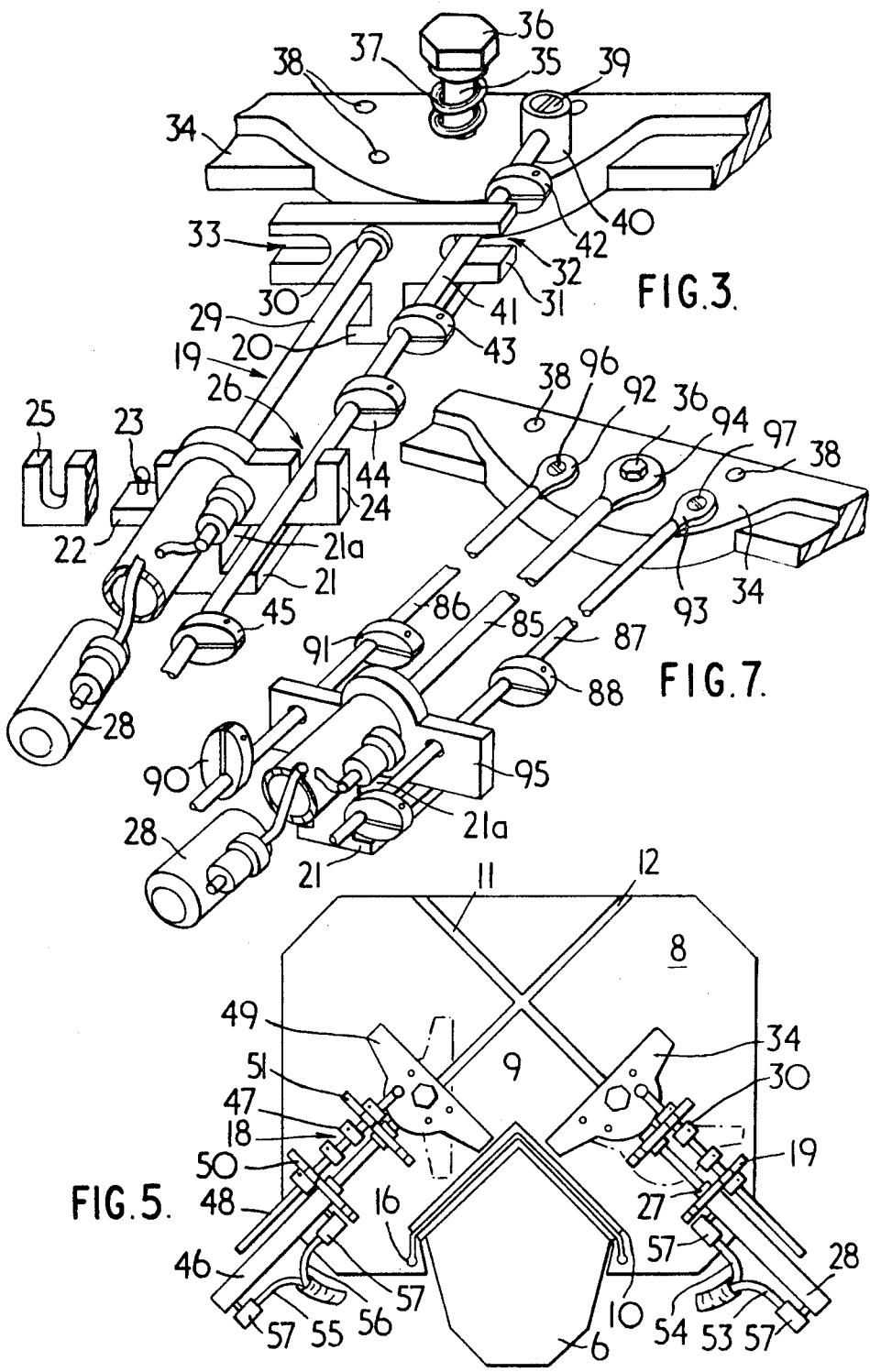

MACHINES FOR CUTTING SHEET MATERIAL, SHEET METAL AND THE LIKE

BACKGROUND OF THE INVENTION

The present invention relates to an automatic system for positioning and aligning the squaring edges in machines for cutting sheet metal or other material in sheet form, at predetermined angles.

In my Italian Pat. No. 774,785, a cutting machine of this kind was described and illustrated, which was designated for manual operation. This machine provided for the use of squaring edges for the positioning of the sheets to be cut in such a way that said edges could be set up manually to accord with the desired angles.

This substantially limited the production rate obtainable from the machine and also the accuracy of the work, since it is frequently necessary to produce in one and the same sheet cutouts or rounded off corners, in various shapes and sizes.

This requires continuous regulation of the guide edges. In these cases, cutting is carried out at an angle and a cutter is used which has two blades arranged at 90° to one another.

SUMMARY OF THE INVENTION

The object of the present invention is to provide improvements for machines of this kind, and more particularly to the guide edges; these improvements consist of automatic means for positioning the guide edges in such fashion as to enable the production of sequences of at least two cuts in different positions.

Another object of the present invention is to provide for the operation of the cutter to be subject to the proper positioning of the item being cut in relation to the guide edges; this positioning is achieved by pneumatically or hydraulically operated means.

Another object of the present invention is to provide a pair of guide edges with means slidable in appropriate guides on the machine bed, means for articulating said guide edges, means for controlling the reciprocating movements of each guide edge in a coordinated way; with the said guide edges at their ends, containing electrical means or devices, for controlling the cutter.

Other objects and advantages of the present invention will become apparent from the ensuing description and drawings, which illustrate by way of example an embodiment of the invention. In the drawings:

BRIEF DESCRIPTION OF THE DRAWINGS

FIG. 1 is a perspective illustration of a shearing machine, providing a partial view from the open rear side;

FIG. 2 is a fragmentary perspective view of the control elements for the guide edges;

FIG. 3 is a perspective view of one of the guide edges complete with the appropriate control elements, although the figure does not show any part of the machine bed;

FIG. 4 is a perspective view of a guide edge, or rather a part of same plus the elements which control the action of the slide;

FIG. 5 is a schematic plan view of the bed of the shearing machine, showing the positions which the guide edges can adopt;

FIG. 6 is a section through part of the machine bed in a plane passing through the hingepin of one of the guide edges and perpendicular to the grooves produced in the bed; and FIG. 7 is a view of a variant embodiment of the guide edge shown in FIG. 3.

DETAILED DESCRIPTION OF THE INVENTION

Referring to these figures in which the same elements, parts of features are in all cases indicated by the same reference number, 1 indicates the machine frame, while 2 and 3 designate a flywheel which is connected by belts 4 to an electric motor (not shown), and, respectively, the slide which moves along a guide 5. The upper part of the slide, or head, is marked 6 while reference 7 designates the door closing off the rear of the machine.

The bed of the shearing machine is marked 8 while reference 9 designates the 90° angle made by the edges lined with projections 10 which act as mating blades cooperating with the blades fixed to the front edges of the head 6.

References 11 and 12 indicate two T-section grooves formed in the bed, parallel with the mating blades 10.

The registers by means of which the positions of the bed can be adjusted in respect of the head of the slide, are market 14 and 15. References 16 indicates a V-shaped element which is fixed to the bed. Between the bed and the bottom edge of the element 16 there is a gap of no more than the maximum width of the sheet which is to be cut (sheared). The element 16, being located adjacent the blades of the slide, provides protection against injury. Reference 17 indicates a cover enclosing the clutch coupling the flywheel and the slide drive shaft, plus the devices, substantially comprised by an electromagnet, which control the clutch. The clutch is of a well-known kind, indicated schematically among other items in my Italian Pat. No. 774,785 and constituted by an element carried by the slide drive shaft which element, being freely mounted, is urged by a spring into a cavity in the flywheel hub. The clutch described is of the kind conventionally employed in mechanical presses and for this reason its major features can be found described in a variety of works on applied mechanics.

Coupled to the guides 11 and 12 of the machine bed, which are of the T-slot kind, are arrangements 18 and 19 which serve to correctly position the sheet which is to be cut. The positioning arrangement 19 is constituted by a pair of slides 20 and 21 which fit in the guide 11, and the slide 21 furthermore carries a small plate 22 which, when the slide is in position in the guide 11, projects slightly above the bed 8. In the plate, vertically disposed screwed holes are produced, i.e., holes which are perpendicular to the surface of bed 8, and into these (only one is visible in FIG. 3), there are screwed the screws 23 which serve to lock the slide 21 in a predetermined position.

Fixed to the slide 21, to the top edge of a block 21a, there is a plate 24 disposed perpendicularly to the bed 8 and the guide 11. Towards the end of the plate 24, cutouts 25 and 26 are formed which are open in the upward direction and are of moderate depth.

At the center of the plate 24, by means of screw arrangements 27 which are visible in FIG. 5, there is fixed a cylinder 28 of a double-acting pneumatic ram.

A rod 29 of the pneumatic ram is fixed by screw means 30, to a plate 31 integral with the slide 20. The plate 31 contains a pair of cutouts 32 and 33 open laterally and of moderate length.

Coupled to the slide 20 (referring now in particular to FIG. 6) there is a guide edge 34 and the front face thereof constitutes one of the guides for the piece of material being cut.

The attachment between guide edges 34 and the slide 20, with the latter being coupled to the guide 11 in tightly toleranced fashion, is obtained by means of a bolt 35 which screws into a hole produced in the spine of the slide 22 and more particularly to a limited depth therein. The arrangement is such that with a spring 37 arranged between head 36 of the bolt 35 and the top surface of the guide edge, the latter can slide under the action of said spring along the surface of the bed.

In the guide edge 34 screwed holes 38 are produced which are located symmetrically in relation to the axis passing through the center of the hole into which the bolt 35 is fitted.

Into one of the aforementioned holes 38, there can be screwed a screw element 39 designed to serve as the hingepin of a terminal portion 40 of a cylindrical rod 41 of moderate length which is carried by the base of one or the other (this will be explained in greater detail hereinafter) of the cutouts 25 and 26, being introduced firstly into the corresponding cutout in the plate 31.

Assembled on the cylindrical rod 41 are blocks 42, 43, 44 and 45 which are positionable along said rod and are arranged as follows: the first in front, i.e., near the guide edge 34 and the plate 31, the second two between the plates 31 and 24, and the final one behind the plate 24.

Each of the blocks assembled on the rod 41 is constituted by a disc containing an eccentric hole whose diameter matches that of the rod and from which there extends towards the furthest distant part of the disc periphery, a slit which is parallel to the axis of the said hole and which can be pinched closed by a pinch bolt screwing into a hole the axis of which is perpendicular to that of the hole first mentioned.

From the foregoing description it will be clear that by supplying compressed air or a pressurized fluid to the cylinder 28, the slide 20 will be displaced, along with the associated guide edge 34, and, at the same time, in the case illustrated in FIG. 3, rotation of the guide edge will take place as a consequence of the respective contacts between the blocks 42 and 43, and 44 and 45, respectively, and the surfaces of the plates 31 and 24, all in accordance with the side of the ram to which the pressure is applied. Equally obviously, by locking the blocks 42 and 43 so that they cooperate with the opposite faces of the plate 31, the supplying of compressed air or a pressurized fluid to the cylinder 28 will simply produce translation of the guide edge 34 and this by an amount corresponding to the positioning along the rod 41 of said blocks 44 and 45.

In this way, then, translation as well as translation plus rotation, can conveniently be set to take place, by appropriate positioning of the aforesaid series of blocks. Again, by clamping the blocks 44 and 45 against the plate 24, leaving only a small clearance, it is possible also by applying pressure to the cylinder to produce rotation alone, in the guide edge 34. Obviously, too, the direction of rotation of the guide edge 34 under the action of the relevant cylinder, will depend upon the side at which the rod 41 is located in relation to the rod or stem 29 of the cylinder. By screwing the screw element 39 into one of the holes of the series 38, the initial position of the guide edges 34 is determined.

The arrangement 18 is exactly identical to the arrangement 19 hereinbefore described. All that is necessary is to list the major elements of the arrangement 18 and these are: cylinder 46, cylinder rod 47, rod 48 for the blocks, guide edge 49 and two plates 50 and 51 which cooperate with the blocks carried by the rod 48.

The guide edges 34 and 49 are controlled, by means of the associated cylinders 28 and 46, through the medium of a three-way valve which is shown in FIG. 1 and is marked 52, since the ends of the cylinders 28 and 46 are connected together in pairs and since along the course of the supply lines going to each end of the cylinders 28 and 46 (which lines are marked 53 and 54, and 55 and 56, respectively) there are arranged bypass valves generally marked 57. These valves 57 are of the kind which, when compressed air is supplied to their input ports, open the line admitting air into the corresponding chamber of the cylinder and which, when the air or fluid supply ceases, open said line leading to the cylinder chamber, to a bleed of variable section constituted by a suitably controllable throttling element, The aforesaid three-way valves, or rather servo valves, are of a commercially obtainable kind. The throttling of the discharge or bleed from the valves 57 determines within certain limits the speed of movement of the piston in the relative cylinder.

In a variant embodiment shown in FIG. 7, the guide edges and their assembly can be guided by a pair of guide elements 86 and 87 articulated together as indicated at 92 and 93 and passing through a block 95. A thrust rod 85 is articulatingly attached beneath the head 36, through the agency of an eye 94. This eliminates the need for the block 35 and makes it possible to better exploit the limits of travel of the guide edge, with the latter being controlled by adjustable stops 88, 89, 90 and 91 which can be placed in appropriate positions.

The valve 52, which is supplied from a compressed air source through a pressure regulator and lubricator unit 68, is controlled through a lever 69 by a cam 70 mounted, as FIG. 1 shows, on the frame of the machine. The cam 70 exhibits four lobes and can therefore occupy eight angular positions; indeed, when moving from one position to the next it changes the position of the lever controlling the valve 52 and thus, each time, reverses the air supply to the cylinders.

The cam 70 shown in FIG. 1, exhibits pins 71 in its face, more precisely eight pins, by means of which (the sole direction of rotation being anticlockwise) it is made to rotate through the agency of an oscillating lever 72 with its fulcrum on the slide 3, with said lever being centrally biased by a spring 73 towards the axis of the cam 70 and having its bottom end in the form of an inclined plane designed to slide over the pins 71 and located at a short distance from the center of the cam, this part of the lever also exhibiting a kind of hook formation 74 which, as the slide continues to descend, passes beneath the appropriate one of said pins and thus produces rotation of the cam 70 and corresponding switching of the valve 52, when the slide rises again.

The frontal parts of the guide edges 34 and 49 are equipped with moving elements designed, when the edges of the sheet which is to be cut are offered thereto, to operate contact-breakers connected electrically in series which, directly, or preferably through a relay, control the solenoids which operate the clutch between the flywheel 2 and the drive shaft of the slide 6.

In FIG. 4, there is schematically illustrated the design of one of the guide edges, more particularly that of the guide edge 34.

In FIG. 4, reference 76 indicates a cavity formed in the frontal part of the guide edge, inside which cavity there is arranged a microswitch 77 the actuator of which is subjected to the effect of a lever 78 appropriately pivotally attached to the body of the guide edge 34, with the bottom face of the lever being in line with the plane of the bed 8 and being spaced slightly away from the actuator of the microswitch 77 by a leaf spring marked 79.

The action of the lever 72 on the pins 71 of the cam 70 is determined by the position of an eccentric 80 fixed to a shaft 81 rotatably mounted in a bearing formed in the rear part of the slide 3 and carrying an operating knob 82. The operation of shearing and of the general mechanism, is as follows:

The power supply to the electric motor is switched on and the latter rotates the flywheel 2 while at the same time the initial positions of the guide edges 34 and 49 are arranged by fitting into the holes, market 38 in the case of the guide edge 34, the end of the corresponding rod so that when the fluid supply is directed to one of the ends of the cylinders 28 and 46 the guide edges assume the requisite position immediately. It should be borne in mind of course that through the discharge ports of the valve 52, operated by the cam 70, in each case two ends of the cylinders 28 and 46 are supplied via each of the discharge ports, said cylinders as mentioned, being of the double-acting kind. Of course, each discharge port of the valve 52 supplies one end of one cylinder and one end of the other.

Once the initial positions of the guide edges have been roughly set up, the stops on the rods 41 and 48 are adjusted in order to determine the exact positions of these guide edges, with these in each case being one of the two positions which said edges will be capable of adopting. This done, the valve 52 is switched, for example by causing the slide 3 to carry out a stroke, and as a consequence the two other ends of the two cylinders are supplied with pressurized fluid so that it is now possible to adjust on the respective rods 41 and 48 the two other blocks which define the second of the positions which the guide edges can adopt. As explained a little earlier, the positions of the guide edges at all times depend upon the positions, along the relevant rods, of a pair of blocks.

Self-evidently, the initial positioning of the guide edges is determined by the point of fixing along the guides 11 and 12, of the arrangements 19 and 18, and this is done in the case of arrangement 19 in fact, by locking the slide 21 through the medium of the screw 23.

Once the above operations have been carried out the machine is ready to carry out the particular operation in relation to which the positions of the pair of guide edges have been set and indeed by offering up to the guide edges 34 and 49 the two edges of the angle of a sheet, the microswitches arranged in said guide edges are closed and accordingly either directly or via a relay, the solenoids which control the clutch causing the slide to produce the working stroke are energized, this with the qualification of course that the offering up of the piece of material to be cut, against the guide edges, is done correctly, failing which the microswitches will not be operated During the downward travel or working stroke of the slide, the lever 72 articulatingly connected thereto engages through its inclined plane portion, the appropriate one of the series 71 of pins projecting from the cam 70, albeit without moving same, the pin, as FIG. 1 shows, being located a little to the right. When the slide subsequently rises to complete the working stroke, the lever 72, which gradually moves towards the right, also rises until its hooked portion 74 engages beneath the pin over which its inclined terminal portion had previously slid. When the working stroke of the slide has been completed and it is returning upwards, the lever 72, with the hooked portion 74, engages the pin of the cam 70 and produces rotation of the latter through an eight of a revolution. Consequently, the valve 52 changes position and directs the supply to the other two ends of the cylinders 28 and 46 so that the associated guide edges 34 and 49 move into the second of the positions established for them. Then, the item being cut having been offered up to the guide edges again, the operation is repeated. It should be borne in mind that the cutting or shearing operation can equally well be carried out on very thin sheet, since the bottom surfaces of the guide edges are always in good contact with the bed 8 thanks to the provision of the springs which are arranged between the slides of the guide edges, and said guide edges themselves.

Considered in closer detail, if reference is made to FIG. 3 the operation of a guide edge positioning arrangement is as follows:

By supplying compressed air or pressurized fluid to that end of the cylinder 28 which is adjacent the guide edge 34, the rod 29 of the cylinder is retracted, drawing with it the slide 22 and consequently both the guide edge and the rod 41, this until the block 44 hits the plate 24. When this has happened, and fluid continuing to be supplied to the aforesaid end of the cylinder, any further retraction of the slide 20 will produce rotation in the guide edge 34 in the clockwise direction until the block 43 hits the plate 31.

With change in the end of the cylinder 28 which is supplied with fluid, the valve 57 fixed to the head of the cylinder is opened to the exterior, and the similar valve fixed to the terminal part of the cylinder is closed so that, of course, the direction of movement of the rod 29 is reversed. All the aforedescribed phases are then repeated, taking into account the fact that the stop elements involved in this second phase are the elements 42 and 45.

If it is required to carry out the same kind of cut all the time, then it is possible to disconnect the automatic guide edge control arrangement very simply by operating the knob 82 and thus the lever 72, so that the latter cannot engage the pins 71 and the cam 70. It is also possible to render one or both the switches arranged in the bodies of the guide edges, and to control the slide through an independent control arrangement. By means of the arrangement illustrated, facility is also created for reversing the movement of one guide edge in relation to that of the other, in quite a simple manner by reversing the lines to one of the rams The present invention is open to numerous modifications and variant forms. For example, if the facility for rotation on the part of the guide edges is not required, then the rod carrying the stops can be fixed, for example by attaching one end to the plate which is secured to the particular ram, and arranging for it to slide in a location formed in the plate carrying the ram cylinder, the travel in this case being determined by a single pair of stops Where the actual design of the arrangement is concerned, the materials, the shapes and the dimensions of the components may in accordance with the invention be chosen to suit the particular requirements.

I claim:

1. In a machine for cutting sheet material, metal sheet and the like, the combination comprising a machine bed to support said sheet material, metal sheet and the like, a vertically reciprocable slide, cutter means carried by the slide, said cutter means having two cutting edges disposed at an angle to each other, a pair of guide edges for guiding said sheet material, metal sheet and the like, two guides formed in said machine bed, each guide extending parallel to a respective one of the two cutting edges, two slide means each arranged to move along a respective one of said two guides in a direction parallel to the respective cutting edge, connecting means articulatingly connecting said guide edges respectively to the two slide means to form two respective guide edge and slide assemblies, drive means operable to apply driving force to each guide edge and slide assembly alternately in one direction and the opposite direction along the respective guide, selectively adjustable stop means on the connecting means, said stop means being operative to cause the driving force to effect selectively either translation alone or rotation alone or both translation and rotation of the respective guide edge, the guide edges being equipped with means for controlling the operation of the vertically reciprocable slide and the vertically reciprocable slide carrying elements for controlling the drive means.

2. In a machine, the combination as claimed in claim 1, wherein each guide edge is articulatingly connected to the associated slide means by means including a pin projecting upwardly from said slide means, an upper surface of the slide means being located below the level of the bed, said pin having a head, a spring arranged to act between the head of the pin and the guide edge to force said guide edge against the surface of the bed.

3. In a machine, the combination as claimed in claim 1, in which said drive means comprises two pneumatic or hydraulic double-acting rams each consisting of a cylinder, piston and piston rod, each cylinder being carried by the machine bed parallel to the guide along which the respective slide means is movable, one end of the piston rod being coupled to the slide means.

4. In a machine, the combination as claimed in claim 3, wherein each guide edge contains a series of holes designed to take a pin, said pin being adapted to couple to the guide edge the end of at least one rod of said connecting means (medium length) passing through a first pair of cutouts formed in a first plate integral with the slide means, said stop means comprising adjustable blocks arranged upon the aforesaid rod and disposed in such fashion as to regulate the limits of travel of each guide edge, a first two of these stops being arranged at opposite sides of said plate integral with the slide means and a second two stops at opposite sides of a second plate fixed to the bed, a cutout formed in said second plate being open in the upward direction and its axis being displaced in relation to the axis of the piston rod.

5. In a machine, the combination as claimed in claim 1, in which said driving means are formed by rams, said rams having their ends connected together two by two, each ram having feed port means, there being arranged in series with each feed port means a control three-way valve, the valve having ports comprising an intake, a discharge which is open when the valve is supplied and goes to the feed port means of each ram, and a throttled bleed port, lines which interconnect the ends of the two rams going to the discharge port of said three-way valve, the valve having an actuating element which is under the control of a rotating multilobe cam which rotates one pitch with each complete stroke of the vertically reciprocable slide, elements controlling said cam being constituted by a lever carried by said vertically reciprocable slide and designed, under the effect of elastic means, to engage drive pins on said cam, said lever, by means of a manually operable eccentric being capable of being locked in position so that said pins cannot be engaged in said manner.

6. In a machine, the combination as claimed in claim 1, in which bodies of the guide edges contain cavities open towards the fronts of said edges and normally closed off by levers articulated to said guide edges, which levers are designed, when the sheet material, metal sheet and the like being cut is offered up to the guide edges, to operate at least one contact-breaker arranged in said cavities and thus operate a clutch which controls a working stroke of the vertically reciprocable slide.